US008819739B2

(12) United States Patent
Yoon et al.

(10) Patent No.: US 8,819,739 B2
(45) Date of Patent: Aug. 26, 2014

(54) INTERACTIVE MULTIMEDIA SERVICE SYSTEM AND METHOD THEREOF

(75) Inventors: Ja-Young Yoon, Seoul (KR); Hong-Seo Yun, Incheon (KR); Hee-Won Park, Seoul (KR); Dong-Won Na, Gyeonggi-dong (KR)

(73) Assignee: SK Telecom Co. Ltd., Seoul (KR)

( * ) Notice: Subject to any disclaimer, the term of this patent is extended or adjusted under 35 U.S.C. 154(b) by 535 days.

(21) Appl. No.: 11/571,735

(22) PCT Filed: Jul. 4, 2005

(86) PCT No.: PCT/KR2005/002119
§ 371 (c)(1),
(2), (4) Date: Oct. 24, 2007

(87) PCT Pub. No.: WO2006/004363
PCT Pub. Date: Jan. 12, 2006

(65) Prior Publication Data
US 2008/0189750 A1 Aug. 7, 2008

(30) Foreign Application Priority Data
Jul. 5, 2004 (KR) ........................ 10-2004-0052129

(51) Int. Cl.
*H04N 7/16* (2011.01)
*H04N 7/173* (2011.01)
(52) U.S. Cl.
USPC .............. 725/62; 725/105; 725/114; 725/133
(58) Field of Classification Search
None
See application file for complete search history.

(56) References Cited

U.S. PATENT DOCUMENTS

| 5,694,163 | A | * | 12/1997 | Harrison | ........................ 725/110 |
|---|---|---|---|---|---|
| 6,064,438 | A | * | 5/2000 | Miller | ............................ 348/465 |
| 6,356,539 | B1 | | 3/2002 | Zuliani et al. | |
| 6,543,053 | B1 | | 4/2003 | Li et al. | |
| 6,640,086 | B2 | | 10/2003 | Wall | |
| 6,774,926 | B1 | * | 8/2004 | Ellis et al. | ...................... 725/133 |
| 2004/0207724 | A1 | * | 10/2004 | Crouch et al. | ............. 348/14.09 |
| 2004/0246376 | A1 | * | 12/2004 | Sekiguchi et al. | ............ 348/468 |
| 2006/0047750 | A1 | * | 3/2006 | Schmitt et al. | ................ 709/204 |
| 2006/0112325 | A1 | * | 5/2006 | Ducheneaut et al. | ....... 715/500.1 |
| 2007/0002777 | A1 | * | 1/2007 | Morris et al. | .................. 370/260 |
| 2007/0127508 | A1 | * | 6/2007 | Bahr et al. | ..................... 370/401 |

FOREIGN PATENT DOCUMENTS

| JP | 07-264570 | | 10/1995 |
|---|---|---|---|
| JP | 2002-369175 | | 12/2002 |
| JP | 2003299044 | | 10/2003 |
| JP | 2004-173320 | | 6/2004 |
| KR | 102200018660 | * | 9/2001 |
| KR | 20010109040 | | 12/2001 |
| KR | 20020078320 | | 10/2002 |
| KR | 1020010018660 | * | 10/2002 |

(Continued)

*Primary Examiner* — Brian T Pendleton
*Assistant Examiner* — Dika C. Okeke
(74) *Attorney, Agent, or Firm* — Baker Hostetler LLP

(57) ABSTRACT

Disclosed is related to an interactive multimedia service system and method thereof using mobile station that is enable to see a broadcasting with real time/non-real time. A broadcasting station broadcasts a multimedia contents composed of the broadcasting contents being broadcasted and the other multimedia contents generated by the mobile station, and transmits the composed multimedia contents to the mobile station. Therefore, the user of the mobile station can see the broadcasting, which the user of mobile station participates in the interactive broadcasting with real time/non-real time.

3 Claims, 5 Drawing Sheets

(56) References Cited

FOREIGN PATENT DOCUMENTS

| | | |
|---|---|---|
| KR | 20030008878 | 1/2003 |
| WO | 99/22502 | 5/1999 |
| WO | 01/19084 | 3/2001 |
| WO | 02/19701 | 3/2002 |

* cited by examiner

Fig. 3
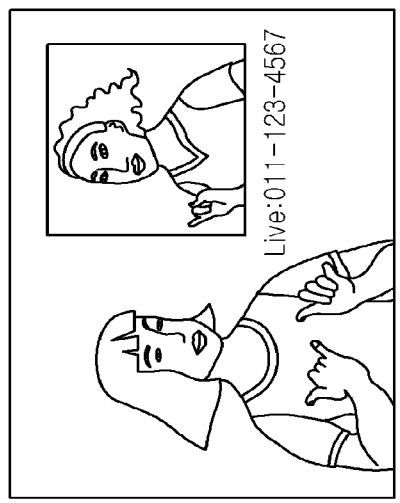
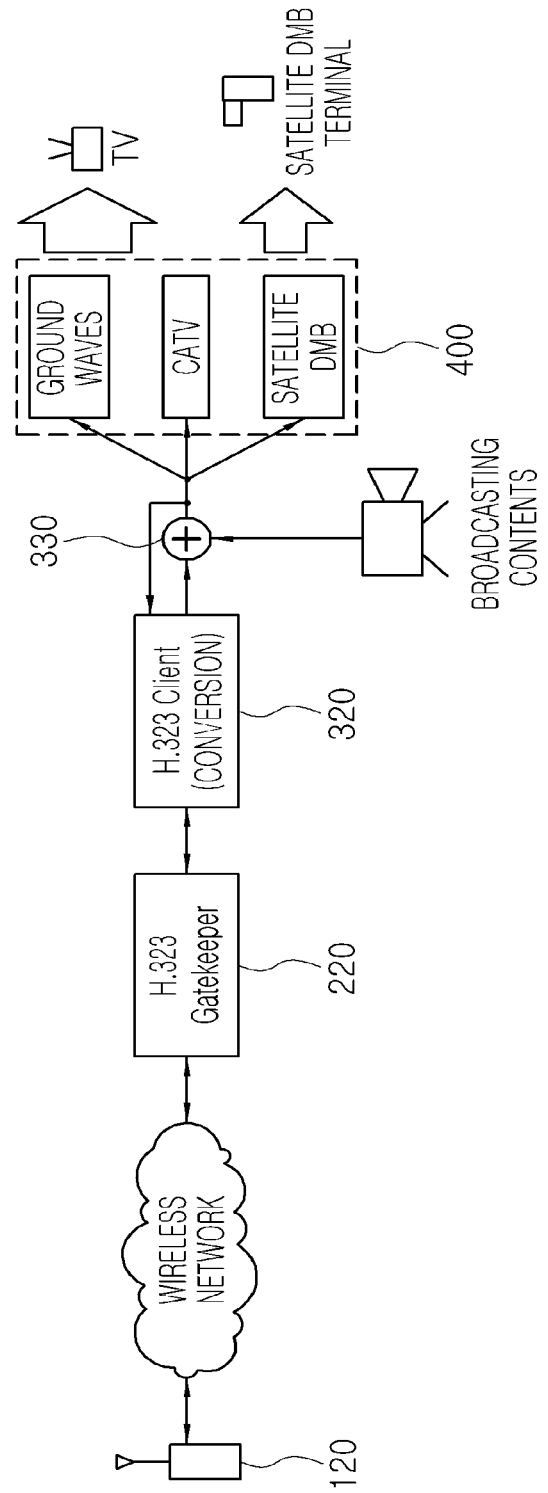

Fig. 4
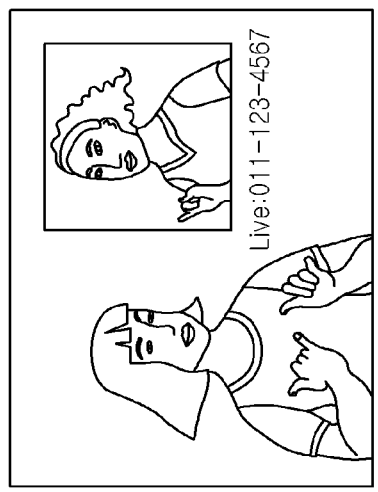
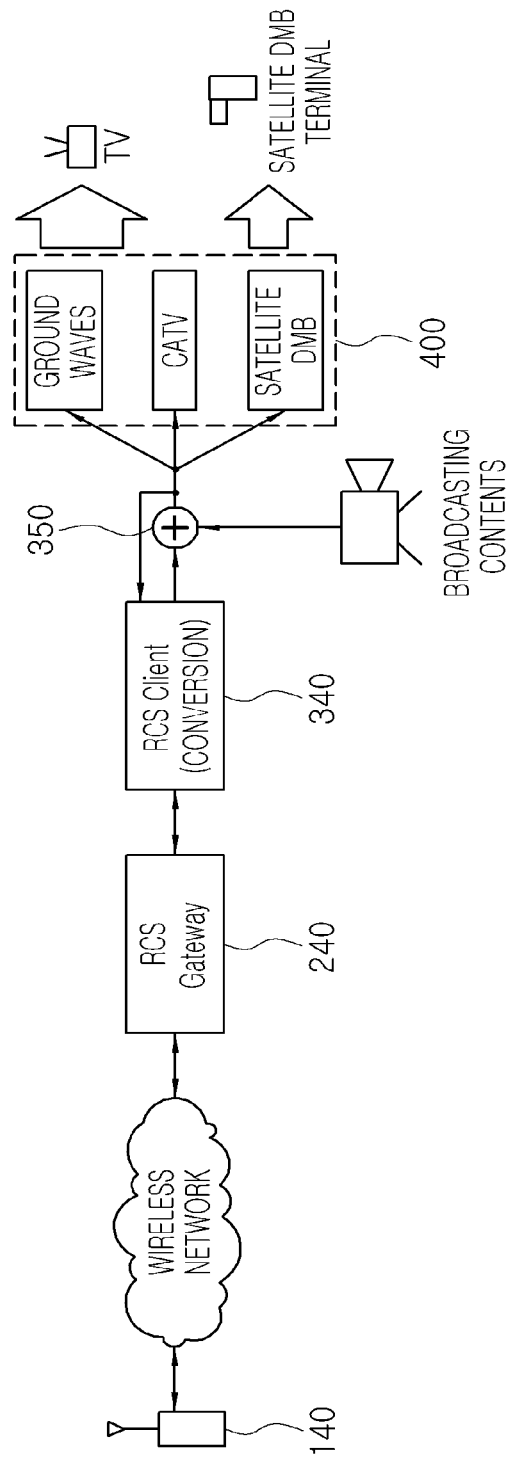

Fig. 5
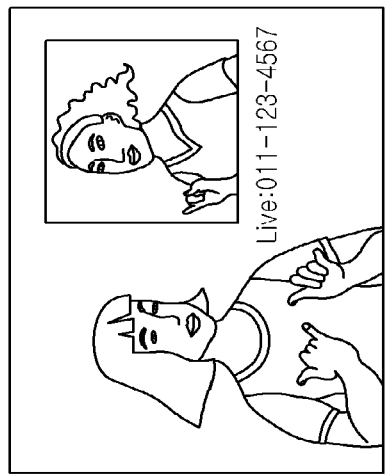
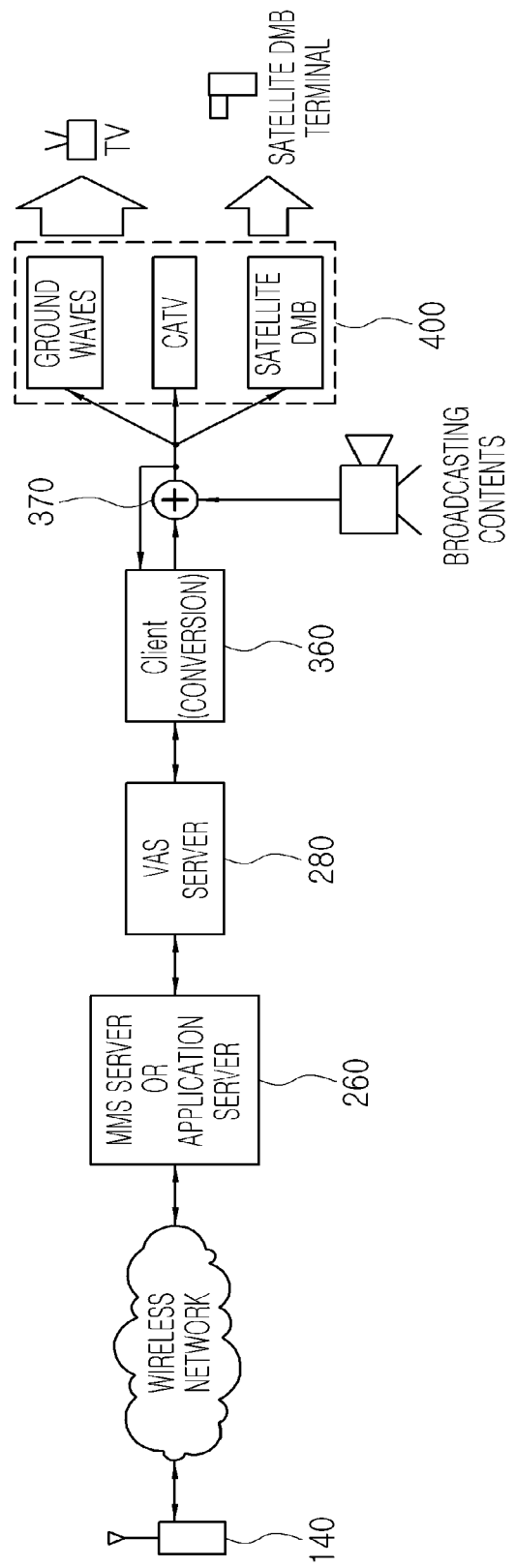

INTERACTIVE MULTIMEDIA SERVICE SYSTEM AND METHOD THEREOF

TECHNICAL FIELD

The present invention relates to a multimedia service system, and, in particular, to an interactive multimedia service system and method thereof.

BACKGROUND ART

Conventional TV or radio broadcast programs have generally used postcards or line telephones to realize an interactive service with viewers and audience. More progressive types of communication are realized through the line telephones with the advent of automatic response system, facsimile, and the like, and communication exchanges with the viewers and audience are performed more freely with the introduction of PC communication, Internet, and mobile terminals.

In addition, attempts have been made to realize interactive services with users by interworking the settop boxes of the users with PSTN (public switched telephone network) and asymmetric digital subscriber line (ADSL) with the introduction of digital broadcasting. However, the interactive service could not be easily implemented due to the limit of the transmission rate of return channels which the settop boxes support, and also the users could not identify on-the-air programs on their settop boxes in person.

On the other hand, as the services for the mobile terminals have been diversified, multimedia contents consisting of texts, videos and voices have been provided to the users via the mobile terminals. The users could transmit or receive the multimedia contents based on WAP (Wireless Application Protocol) or ME (Mobile Explorer) browsers of the mobile terminals supporting wireless Internet.

With the development of the above-stated technologies, there has been currently introduced a service which transmits the multimedia contents (advertising information, e-commerce related information, etc.) provided to media, which require the interactive services (TVs, PCs, etc.) to the users of the mobile terminals, and thereafter transmits in real time the users' responses and requests (poll participation, advertising participation, buying products, requests for discount coupons, etc.) back to the system of a service provider via the mobile terminals.

That is, the service method synchronizes the multimedia contents with the information (for example, text information) transmitted to the mobile terminals of the users in time, and then pushes the multimedia contents to TVs and the mobile terminals and transmits the users' requests in response to the multimedia contents to the system of the service provider via the mobile terminals. Accordingly, the users can participate in a media broadcasting, such as TVs, in real time.

DISCLOSURE OF INVENTION

Technical Problem

However, the above-described service method can only offer very restricted interactive services. In other words, since the users with the mobile terminals participate in a broadcast program in real time by using text messages in addition to voice communication with a program host in the current broadcast programs, the service method has a problem in that the interactive services are very restricted.

Technical Solution

The present invention is to solve the above-described problem. An object of the present invention is to provide an interactive multimedia service system and method capable of uploading multimedia created by a mobile terminal in real/non-real time.

In addition, another object of the present invention is to provide an interactive multimedia service system and method, in which the users with the mobile terminals participate in a broadcast program in real time by exchanging video information, and the users can see the broadcast program via the mobile terminals in real/non-real time.

According to a first aspect of the present invention, there is provided an interactive multimedia service system comprising: a mobile terminal for creating multimedia contents and encoding said multimedia contents in real time; and a broadcasting station server which, after setting up a call through a predetermined protocol, receives and decodes said multimedia contents, then converts said decoded multimedia contents into broadcasting signals to synthesize said broadcasting signals with an on-the-air broadcast program, and broadcasts said synthesized broadcast program.

According to a second aspect of the present invention, there is provided an interactive multimedia service system comprising: a mobile terminal for creating multimedia contents and encoding said multimedia contents in real time; a service provision server for receiving said encoded multimedia contents from said mobile terminal according to a predetermined protocol, and transmitting said multimedia contents synthesized with a broadcast program; and a broadcasting station server, which, after receiving and decoding said multimedia contents, converts said multimedia contents into broadcasting signals, synthesizes said converted multimedia contents with an on-the-air broadcast program, broadcasts said synthesized broadcast program, and at the same time, re-encodes said synthesized broadcast program in real time according to said protocol to transmit said re-encoded program to said service provision server.

Meanwhile, according to the first aspect of the present invention, there is provided an interactive multimedia service method comprising the steps of: (i) a mobile terminal creating multimedia contents and then transmitting said multimedia contents to a broadcasting station server via a service provision server; (ii) said broadcasting station server receiving said multimedia contents to convert them into format suitable broadcasting signals, and after synthesizing said broadcasting signals with an on-the-air broadcast program to broadcast said synthesized broadcast program to service media, transmitting said synthesized broadcast program to said service provision server; and (iii) said service provision server converting said synthesized broadcast program into multimedia contents suitable for said mobile terminal and then transmitting said converted multimedia to said mobile terminal.

Preferably, said step (i) further comprises the steps of: (i) said mobile terminal creating multimedia contents and then setting up a call with a broadcasting station server; and (ii) when said call is set up, said mobile terminal transmitting said multimedia contents to said broadcasting server via a service provision server.

In addition, according to the second aspect of the present invention, there is provided an interactive multimedia service method provided by a broadcasting station server comprising the steps of: (a) receiving multimedia contents based on a predetermined protocol from a mobile terminal and decoding said multimedia contents; (b) synthesizing said multimedia contents with an on-the-air broadcast program; and (c) broadcasting said synthesized broadcast program.

Preferably, said interactive multimedia service method further comprises the steps of: (d) encoding said synthesized broadcast program after the synthesis in said step (b) to convert it into multimedia contents based on said protocol; and (e) transmitting said multimedia contents converted in said step (d) to said mobile terminal.

In addition, according to a third aspect of the present invention, there is provided an interactive multimedia service method performed at a mobile terminal comprising the steps of: (i) creating multimedia contents and encoding said multimedia contents; (ii) setting up a call with a broadcasting station server via a wireless network; (iii) transmitting said encoded multimedia contents to said broadcasting station server via a wireless network; and (iv) receiving said multimedia contents synthesized with a broadcast program from said broadcasting station server in real time.

Advantageous Effects

The present invention has the effect capable of uploading the multimedia contents, which are being created by the mobile terminal, in real time.

In addition, the present invention has the effect capable of interactively exchanging the information with the TV program host by transmitting the multimedia or the video conference information, which is being produced by the mobile terminal in real time.

In addition, the present invention has the effect that the user of the mobile terminal can receive the interactive TV broadcast contents, in which the user actually participates, in real time, since the TV broadcast program including the multimedia contents transmitted by the user and the TV broadcast contents are fed back to the user of the mobile terminal.

BRIEF DESCRIPTION OF THE DRAWINGS

FIG. 3 is a block diagram showing an interactive multimedia service system according to a first embodiment of the present invention.

FIG. 4 is a block diagram showing an interactive multimedia service system according to a second embodiment of the present invention.

FIG. 5 is a block diagram showing an interactive multimedia service system according to a third embodiment of the present invention.

BEST MODE FOR CARRYING OUT THE INVENTION

A preferred embodiment of the present invention will be described in detail hereinbelow, with reference to the drawings.

Figure 1:
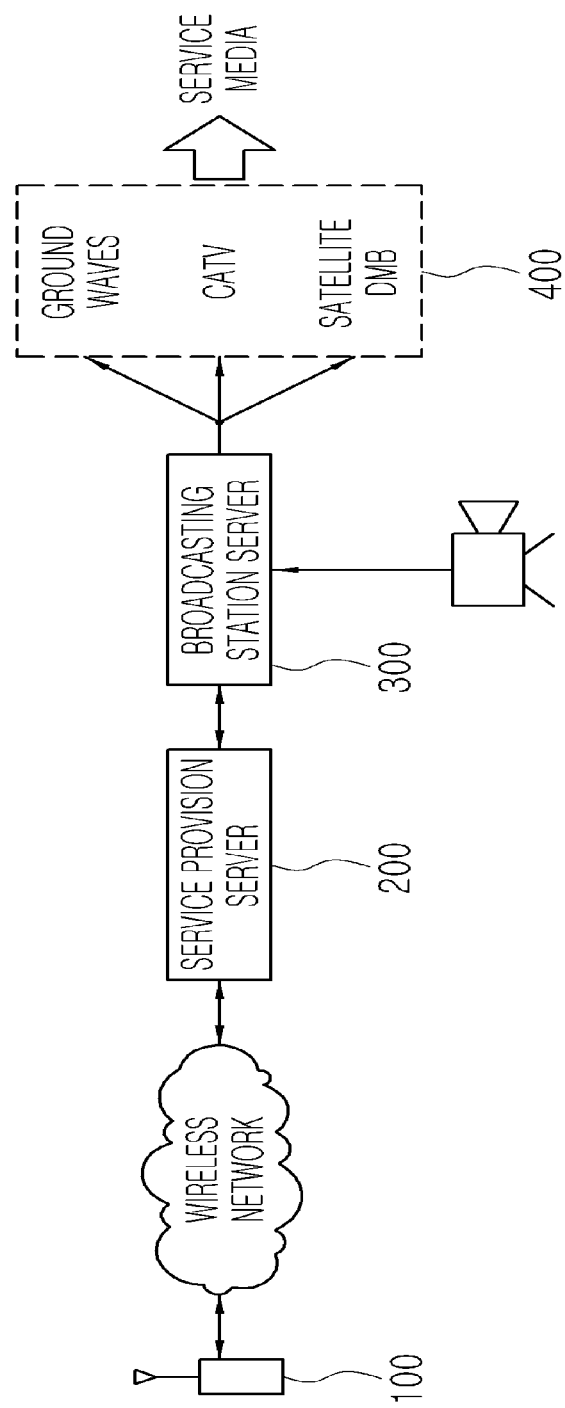
FIG. 1 is a schematic view showing an interactive multimedia service system according to the present invention.

FIG. 1 is a schematic view showing an interactive multimedia service system according to the present invention.

As shown in FIG. 1, the interactive multimedia service system comprises: a mobile terminal (100) for creating/processing various multimedia contents; a service provision server (200) for connecting to a wireless network and a broadcasting station server (to be described later) for re-processing said multimedia contents and then transmitting/receiving said re-processed multimedia contents to said wireless network and said broadcasting station server; and a broadcasting station server (300) for connecting to said service provision server (200) to convert said multimedia contents to broadcasting signals, and then synthesizing said broadcasting signals with a broadcast program to transmit said synthesized broadcast program to service media (for example, TVs) and said service provision server (200) via transmission means, such as ground waves, cables, Internet, satellites, etc.

The mobile terminal (100) creates various multimedia contents and integrates a codec (not shown) for encoding videos or video/audio information in real/non-real time in order to support a predetermined protocol, for example, RTP (Real-Time Transport Protocol)/RTCP (RTP Control Protocol)/RTSP (Real-Time Streaming Protocol) into it.

In addition, the mobile terminal (100) creates the multimedia contents to transmit the multimedia contents to the broadcasting station server (300) via the wireless network and the service provision server (200). The broadcasting station server (300) receives the broadcast program synthesized with the multimedia contents via the service provision server (200) and the wireless network to display them on a screen in real/non-real time.

The service provision server (200) supports the wireless network which interworks with the mobile terminal (100), and includes various clients for the protocol (for example, an RTP/RTCP/RTSP client corresponding to the RTP/RTCP/RTSP protocol). In addition, the service provision server (200) includes a contents converter (not shown) for converting the broadcast program into a format suitable for multimedia contents for mobile terminals.

The broadcasting station server (300) receives and decodes the encoded multimedia contents signals transmitted from the service provision server (200). In addition, the broadcasting station server (300) converts the multimedia contents signals into a format suitable for broadcasting signals (for example, PAL (Phase Alternation by Line System), NTSC (National Television System Committee)) to synthesize the broadcasting signals with an on-the-air broadcast program. The broadcasting station server (300) broadcasts the synthesized broadcast program to service media (for example, TVs, CATVs, satellite DMB (Digital Multimedia Broadcasting)) such as ground waves, cables, Internet, satellite, etc. At the same time, the broadcasting station server (300) transmits the synthesized broadcast program to the service provision server (200).

Figure 2:
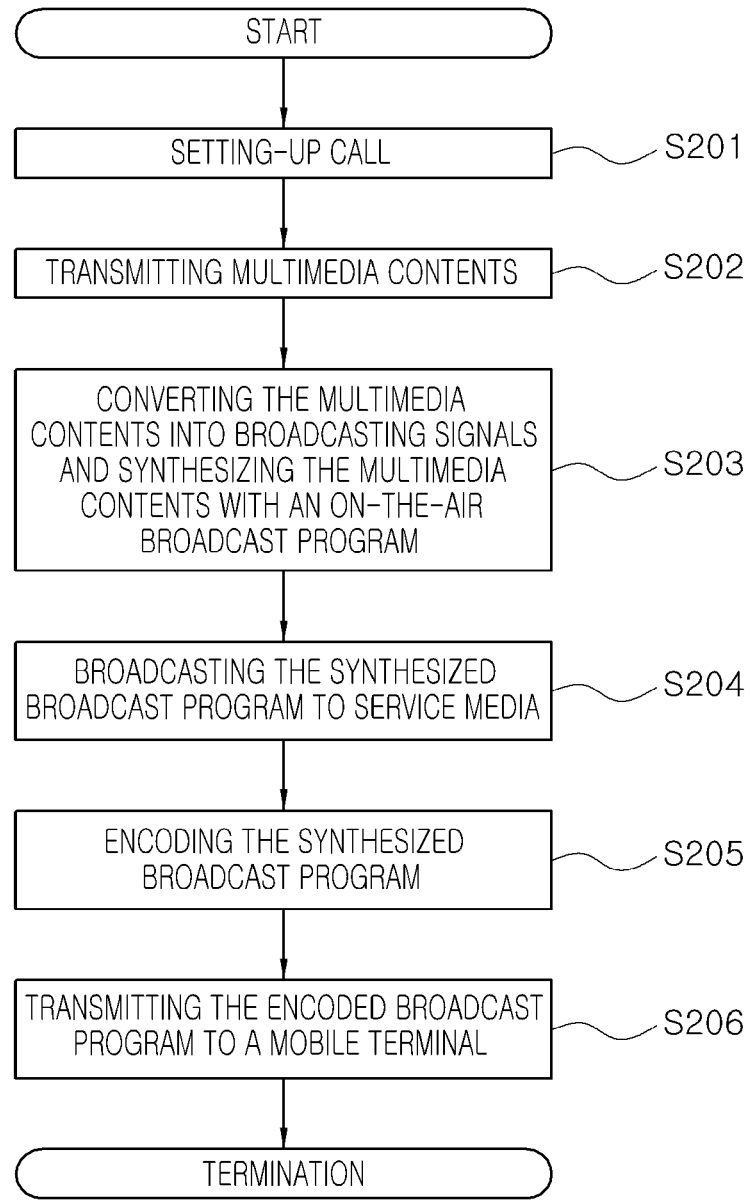
FIG. 2 is a flow diagram showing an interactive multimedia service method according to the present invention.

The interactive multimedia service method according to the present invention will be described with reference to FIG. 2 hereinbelow.

Firstly, the mobile terminal (100) sets up a call with the service provision server (200) in order to transmit currently-created multimedia contents (for example, videos which a user is taping) (S201).

When the call is set up, the mobile terminal (100) transmits said multimedia contents to the broadcasting station server (300) via the service provision server (200) (S202).

The broadcasting station server (300) receives said multimedia contents to convert them into a format suitable for broadcasting signals, and then synthesizes the converted multimedia contents with an on-the-air broadcast program (S203).

Then, the broadcasting station server (300) broadcasts said synthesized broadcast program to service media such as ground waves, cables, Internet, satellites, etc. (S204). At the same time, the broadcasting station server (300) transmits said broadcast program to the service provision server (200). More specifically, said broadcasting station server (300) may be a broadcasting center capable of broadcasting as an example.

The service provision server (200) converts said synthesized broadcast program to multimedia contents suitable for the mobile terminal (100), and then transmits the converted multimedia contents to the mobile terminal (100) (S205-

S206). More specifically, said service provision server (200) may be a mobile carrier server as an example.

Then, the mobile terminal (100) receives the converted multimedia contents to receive broadcast contents, in which the mobile terminal is actually participating, and displays the broadcast contents on a screen, if desired. At this time, the converting of said synthesized broadcast program into the multimedia contents suitable for the mobile terminal (100) may be performed by the broadcasting station server (300). That is, a H.323 client may be included in the broadcasting station server (300).

This concept is described hereinafter in more detail with embodiments of the present invention with reference to the accompanying drawings.

1) FIRST EMBODIMENT: A Real-time Interactive TV Service Using a Video Conference Protocol FIG. 3 is a block diagram showing an interactive multimedia service system according to a first embodiment of the present invention.

As shown in FIG. 3, the interactive multimedia service system comprises: a mobile terminal (120) with an H.323 client supporting a video conference protocol; a gatekeeper (220) for setting up a call of said mobile terminal (120) to receive multimedia contents transmitted via a wireless network; an H.323 client (320) connected to said gatekeeper (220) for receiving the multimedia contents to convert the multimedia contents into a format suitable for broadcasting signals; a broadcast program synthesizer (330) for synthesizing said converted multimedia contents with an on-the-air broadcast program; and a broadcasting transmitter (400) for transmitting said synthesized broadcast program to service media such as ground waves, cables, Internet, satellites, etc.

The mobile terminal (120) includes: an H.323 client (not shown); a video codec (not shown), such as MPEG4 or H.26x, for encoding videos in real time; and an audio codec (not shown), such as G.72x, AMR (Audio Modem Riser), QCELP (Qualcomm Code Excited Linear Prediction), AAC (Advanced Audio Coding) or AAC+, for encoding voice/audio in real time. The gatekeeper (220) may be positioned at the broadcasting station server (300) or the service provision server (200), but when the gatekeeper needs to be separately installed for interworking, the H.323 client must be added/interworked between a gatekeeper of a broadcasting station and a gatekeeper of a mobile carrier to transmit/receive therebetween.

In addition, the H.323 client (320) converts the multimedia contents into a format suitable for the broadcasting signal, and also re-converts the synthesized broadcast program fed back from the broadcast program synthesizer (330) into multimedia contents for the mobile terminal (120).

An interactive multimedia service method according to the first embodiment described above is described hereinbelow.

Firstly, the mobile terminal (120) sets up a call with the gatekeeper (220) in order to transmit currently-created multimedia contents (for example, videos which the mobile terminal (120) is taping).

The gatekeeper (220) may be positioned at the broadcasting station server (300) or the service provision server (200), but when the gatekeeper needs to be separately installed for interworking, the H.323 client (not shown), as described above, may be interworked between a gatekeeper of a broadcasting station and a gatekeeper of a mobile carrier to transmit/receive therebetween.

When the call is set up, the mobile terminal (120) encodes videos via the video codec, such as MPEG4, H.26x, and so on, in real time, encodes voice/audio via the audio codec, such as G.72x, AMR, QCELP, AAC, AAC+, etc., in real time, and thereafter transmits the encoded multimedia contents to the gatekeeper (220) via an RTP/RTCP protocol.

The H.323 client (320), then, receives/decodes the real-time encoded multimedia contents, and then converts the multimedia contents into a format suitable for broadcasting signals to transmit the converted multimedia contents to the broadcast program synthesizer (330). The broadcast program synthesizer (330) synthesizes the converted multimedia contents with an on-the-air broadcast program.

The broadcasting transmitter (400), then, broadcasts the synthesized broadcast program to service media (for example, TVs, CATVs, and satellite DMB) via ground waves, cables, Internet, satellites, etc.

At the same time, when the synthesized broadcast program is fedback, the H.323 client (320) encodes in real time video/audio via a video codec such as MPEG4, H.26x, etc. and an audio codec such as G.72x, AMR, QCELP, AAC, AAC+, etc. to then transmit the encoded multimedia contents to the mobile terminal (120) via the gatekeeper (220).

The mobile terminal (120), then, receives the multimedia contents to receive a broadcast program, in which the mobile terminal (120) is actually participating.

Accordingly, a real-time video conference is provided between a TV program host and an outside user of the mobile terminal (120), and at this time, the TV program broadcasts TV broadcast contents including the contents of the video conference with the user of the mobile terminal (120). In addition, the user of the mobile terminal (120) can receive in real time the interactive TV broadcast contents in which the user is actually participating through the video conference.

2) SECOND EMBODIMENT: A Real-time Interactive TV Service Using an RTP/RTCP/RTSP Protocol FIG. 4 is a block diagram showing an interactive multimedia service system according to a second embodiment of the present invention.

As shown in FIG. 4, the interactive multimedia service system comprises: a mobile terminal (140), which supports an RTP/RTCP/RTSP protocol and on which a real time codec module is mounted; an RCS (Real Time Codec System) gateway (240) for setting up a call with said mobile terminal (140) to receive multimedia contents transmitted via a wireless network; an RCS client (340) connected to said RCS gateway (240) for receiving said multimedia contents to convert said multimedia contents into a format suitable for broadcasting signals; a broadcast program synthesizer (350) for synthesizing said converted multimedia contents with an on-the-air broadcast program; and a broadcasting transmitter (400) for transmitting said synthesized broadcast program to service media via ground waves, cables, Internet, satellites, etc.

The mobile terminal (140), which supports the RTP/RTCP/RTSP protocol and on which the real time code module is mounted, includes a video codec, such as MPEG4, H.26x, etc., for encoding videos in real time, and an audio codec, such as G.72x, AMR, QCELP, AAC, AAC+, etc. for encoding voice/audio in real time.

The RCS gateway (240) may be positioned at the broadcasting station server (300) or the service provision server (200), but when the RCS gateway (240) needs to be separately positioned, the RTP/RTCP/RTSP protocol (not shown) is interworked between an RCS gateway of a broadcasting station and an RCS gateway of a mobile carrier for transmitting/receiving therebetween.

In addition, the RCS gateway (340) converts the multimedia contents into a format suitable for broadcasting signals, and also converts the synthesized broadcast program fedback from the broadcast program synthesizer (330) into multimedia contents suitable for the mobile terminal (140).

An interactive multimedia service method according to the second embodiment described above is described hereinbelow.

Firstly, the mobile terminal (140), which supports the RTP/RTCP/RTSP protocol and on which the real time codec module is mounted, sets up a call with the RCS gateway (240) in order to transmit currently-created multimedia contents (for example, videos which the mobile terminal (140) is currently taping).

The RCS gateway (240) may be positioned at the broadcasting station server (300) or the service provision server (200), but when the RCS gateway (240) needs to be separately positioned for interworking, the RTSP/RTCP/RTSP client (not shown) is interworked between the broadcasting station and the mobile carrier for the transmission/receipt therebetween.

When the call is set up, after encoding videos in real time via the video codec such as MPEG4, H.26x, etc., and encoding voice/audio in real time via the audio codec such as G.72x, AMR, QCELP, AAC, AAC+, etc., the mobile terminal (140) transmits the encoded multimedia contents to the RCS gateway (240) via the RTP/RTCP/RTSP protocol.

The RCS client (340), then, receives/decodes the real-time encoded multimedia contents to convert them into a format suitable for broadcasting signals, and then transmits the converted multimedia contents to the broadcast program synthesizer (330), which synthesizes the converted multimedia contents with an on-the-air program.

The broadcasting transmitter (400), then, broadcasts the synthesized broadcast program to service media (for example, TVs, CATVs, and satellite DMB) via ground waves, cables, Internet, satellites, etc.

At the same time, when the synthesized broadcast program is fed back, the RCS client (340) encodes video/audio in real time via the video codec such as MPEG4, H.26x, etc. and the audio codec such as G.72x, AMR, QCELP, AAC, AAC+, etc. to transmit the encoded video/audio to the mobile terminal (140) via the RCS gateway (240).

Then, the mobile terminal (140) receives the encoded video/audio to receive the broadcast contents, in which the mobile terminal (140) is actually participating.

Accordingly, the user of the mobile terminal (140), which supports the RTP/RTCP/RTSP protocol and on which the real time codec module is mounted, transmits the multimedia, which are being taken in real time, whereby the user can exchange information interactively with a TV program host. At this time, the TV program broadcasts TV broadcast contents including the multimedia contents, which the user of the mobile terminal (140) transmitted. In addition, the user of the mobile terminal (140) can receive the interactive TV broadcast contents, in which the user is actually participating.

3) THIRD EMBODIMENT: A Real/Non-real Time Interactive TV Service Using an HTTP Protocol FIG. 5 is a block diagram showing an interactive multimedia service system according to a third embodiment of the present invention.

As shown in FIG. 5, the interactive multimedia service system comprises: a mobile terminal (160), which supports a multimedia transmitting/receiving protocol such as an HTTP (Hypertext Transfer Protocol)/MIME (Multipurpose Internet Mail Extensions) or HTTP/MM1 (Multimedia Message 1) and on which a multimedia codec module is mounted; an MMS (Multimedia Messaging Service) relay server for receiving and uploading said multimedia contents from said mobile terminal (160) or an application server (260) supporting HTTP transmission and receipt; a VA (Valued Added) application server (280) for providing a broadcasting equipments interface via an MM7 protocol; a client (360) for receiving said multimedia contents and converting them into a format suitable for broadcasting signals; a broadcast program synthesizer (370) for synthesizing said converted multimedia contents with an on-the-air program; and a broadcasting transmitter (400) for transmitting said synthesized broadcast program to service media via ground waves, cables, Internet, satellites, etc.

The mobile terminal (160), which supports a multimedia transmitting/receiving protocol such as an HTTP/MIME or HTTP/MM1 and on which a multimedia codec module is mounted, comprises a video codec such as MPEG4, H.26x for encoding videos in real time and an audio codec such as G.72x, AMR, QCELP, AAC, AAC+, etc. for encoding voice/audio in real time, and stores the multimedia contents as an MP4 (MPEG-2 AAC) format.

The MMS relay server or the application server (260) supporting HTTP transmission and receipt and the VA application server (280) may be positioned at the broadcasting station or the mobile carrier. However, when they need to be separately positioned for interworking, they interwork based on the HTTP/MIME, HTTP/MM1 or SMTP protocol.

In addition, the client (360) converts the multimedia contents into a format suitable for broadcasting signals, and re-converts the synthesized broadcast program fed back from the broadcast program synthesizer (330) into the multimedia contents for the mobile terminal (160).

An interactive multimedia service method according to the third embodiment described above is explained hereinbelow.

Firstly, the mobile terminal (160), a multimedia transmitting/receiving protocol such as an HTTP/MIME or HTTP/MM1 and on which a multimedia codec module is mounted, encodes currently-created multimedia contents (for example, videos which the mobile terminal is taping) in real time via a video codec such as MPEG4, H.26x, etc., and encodes voice/audio via an audio codec such as G.72x, AMR, QCELP, AAC, AAC+, etc. in real time to store the multimedia contents as an MP4 format file.

Then, the mobile terminal (160) uploads the MP4 format file to the MMS relay server or the application server (260) supporting HTTP transmission and receipt via the multimedia transmitting/receiving protocol, and then transmits the MP4 format file to the VA application server (280) providing a broadcasting equipment interface (not shown) via a MM7 protocol.

At this time, the MMS relay server or the application server (260) supporting HPPT transmission and receipt and the VA application server (280) may be positioned at the broadcasting station or the mobile carrier. However, when they need to be separately positioned for interworking, they are interworked based on the HTTP/MIME, HTTP/MM1 or SMTP protocol.

Then, the client (360) receives/decodes the real-time encoded multimedia contents, converts the multimedia contents into a format suitable for broadcasting signals, and transmits the converted multimedia contents to the broadcast program synthesizer (330), which synthesizes the multimedia contents with an on-the-air broadcast program.

Then, the broadcasting transmitter (400) broadcasts the synthesized broadcast program to service media (for example, TVs, CATVs, and satellite DMB) via ground waves, cables, Internet, satellites, etc.

At the same time, when the synthesized broadcast program is fed back, the client (360) encodes video/voice/audio in real time via the video codec such as MPEG4, H.26x, etc. and the audio codec such as G.72x, AMR, QCELP, AAC, AAC+, etc. to transmit the encoded multimedia contents to the mobile terminal (160) supporting HTTP/MIME, HTTP/MM1 protocol client (not shown) via the MMS server (260) of the mobile carrier.

At this time, the user of the mobile terminal (160) can see the broadcasting contents, in which he is actually participating, via a predetermined key, or can see the multimedia contents which are being currently produced.

The mobile terminal (160) transmits the multimedia, which is being taken in real time, so that the user of the mobile terminal (160) can interactively exchange information with the TV program host.

At this time, since the TV program is the TV broadcast contents including the multimedia contents, which the user of the mobile terminal (160) transmitted, the user of the mobile terminal (160) can receive the interactive TV broadcast contents, in which the user actually participates, in non-real time.

The invention claimed is:

1. An interactive multimedia service system comprising:
    a mobile terminal for creating multimedia contents, encoding said multimedia contents in real time and transmitting said multimedia contents through a wireless network;
    a broadcasting station server for receiving said multimedia contents, converting said multimedia contents into broadcasting signals, synthesizing said broadcasting signals with an on-the-air broadcast program, and broadcasting said synthesized broadcast program through a broadcasting media;
    an interactive server functioning as either a service provision server, a gatekeeper or gateway with the gatekeeper or gateway being located in said broadcasting station server or in the service provision server for connecting said wireless network to said broadcasting station server and for converting the multimedia contents into a suitable content for broadcasting signals such that said synthesized broadcast program can be transmitted from said broadcasting station server back to said mobile terminal so that said mobile terminal displays said synthesized broadcast program in real time;
    wherein the synthesized broadcast program is decoded by said server according to a predetermined protocol with said protocol being selected from the group consisting of H.323 and at least one of RTP (Real-time Transport Protocol)/RTCP (Real time Control Protocol/RTSP (Real-time Streaming Protocol), and HTTP (Hypertext Transfer Protocol) and
    wherein said gatekeeper or gateway sets up a call with the mobile terminal and said mobile terminal includes a video codec for performing a real-time encoding of said multimedia contents via the video codec upon initiation of the call set up by the gatekeeper to the mobile terminal and for streaming the encoded multi-media contents to the gatekeeper in real time via said protocol with said mobile terminal participating in said real time broadcast program such that the user of the mobile terminal receives interactive TV broadcast content in real time.

2. An interactive multimedia service method comprising the steps of:
    (1) using a mobile terminal to which a user is connected for creating multimedia contents and for setting up a call over the internet with a broadcasting station server;
    (2) using the mobile terminal after the call is set up for transmitting said multimedia contents to the broadcasting station server via a service provision server adapted to convert the multimedia contents into a suitable content for broadcasting signals to said broadcasting station server based on a predetermined protocol with said protocol being selected from the group consisting of H.323 and at least one of RTP (Real-time Transport Protocol)/RTCP (Real time Control Protocol)/RTSP (Real-time Streaming Protocol), and HTTP (Hypertext Transfer Protocol);
    (3) said broadcasting station server synthesizing said multimedia contents with an on-the-air broadcast program, broadcasting said synthesized broadcast program through a broadcasting media, and transmitting said synthesized broadcast program to said service provision server; and
    (4) wherein said service provision server decodes said synthesized broadcast program according to said predetermined protocol suitable for said mobile terminal and then transmits said decoded multimedia to said mobile terminal so that said mobile terminal can display said synthesized broadcast program in real time.

3. An interactive multimedia service method performed at a mobile terminal under the operation of a user comprising the steps of:
    (1) using said mobile terminal for creating multimedia contents and having a codec for encoding said multimedia contents in real time and transmitting said multimedia contents through a wireless network;
    (2) using the mobile terminal for setting up a call over the internet with a broadcasting station server and after the call is set up transmitting said multimedia contents to the broadcasting station server via a service provision server;
    (3) using said service provision server for converting said multimedia contents into broadcasting signals based on a predetermined protocol with said protocol being selected from the group consisting of H.323 and at least one of RTP (Real-time Transport Protocol)/RTCP (Real time Control Protocol)/RTSP (Real-time Streaming Protocol), and HTTP (Hypertext Transfer Protocol);
    (4) using said broadcasting station server for synthesizing said broadcasting signals with an on-the-air broadcast program, and broadcasting said synthesized broadcast program through a broadcasting media based on said predetermined protocol and transmitting said synthesized broadcast program to said service provision server; and
    (5) wherein said service provision server decodes said synthesized broadcast program according to said predetermined protocol suitable for said mobile terminal and then transmits said decoded multimedia to said mobile terminal so that said mobile terminal can display said synthesized broadcast program in real time.

* * * * *